UNITED STATES PATENT OFFICE.

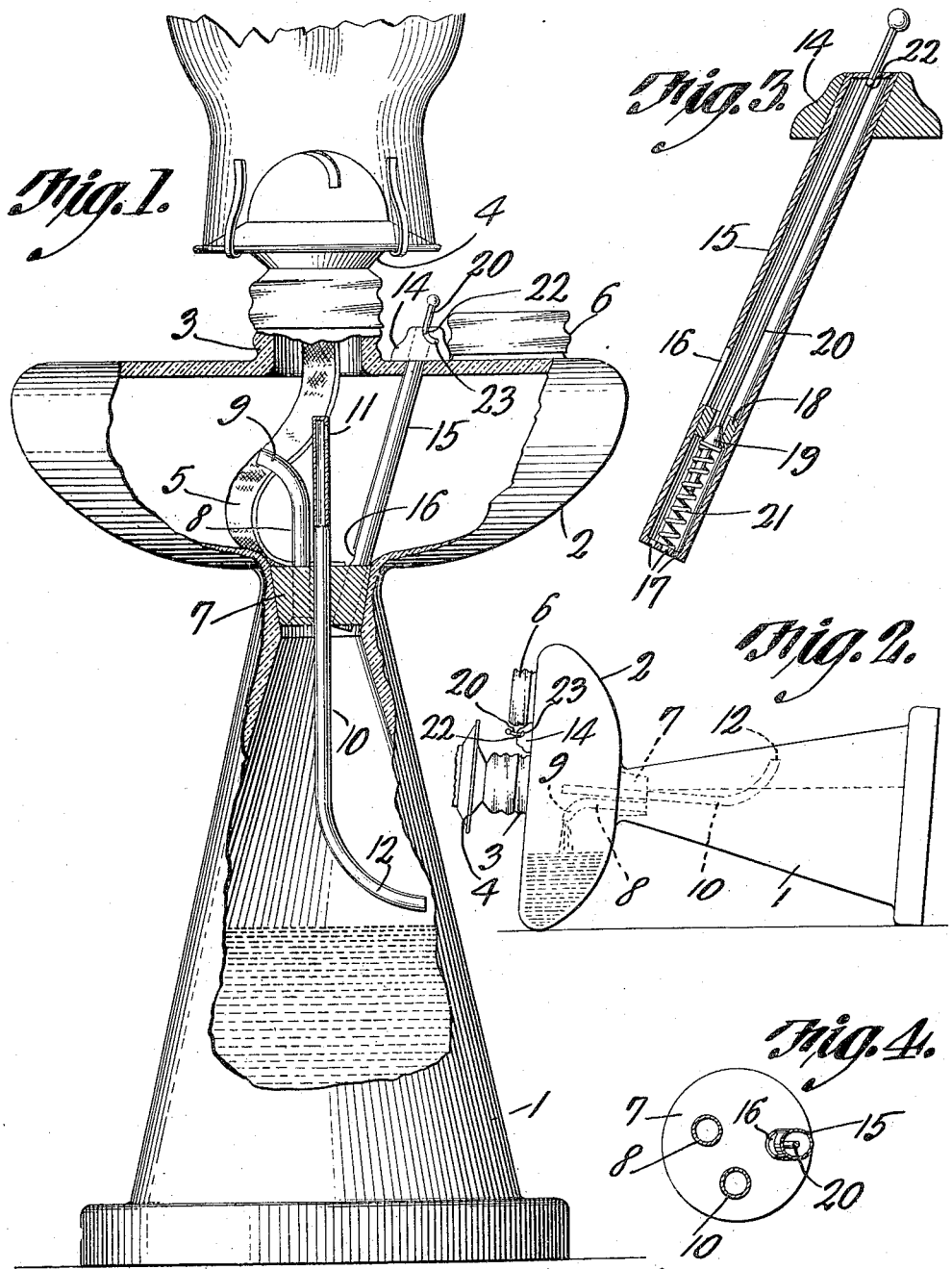

CHARLES N. CRAFTON, OF OWENSBORO, KENTUCKY.

LAMP.

1,124,396.  Specification of Letters Patent.  Patented Jan. 12, 1915.

Application filed March 16, 1914. Serial No. 825,078.

*To all whom it may concern:*

Be it known that I, CHARLES N. CRAFTON, a citizen of the United States, residing at Owensboro, in the county of Daviess and State of Kentucky, have invented a new and useful Lamp, of which the following is a specification.

The device forming the subject matter of this application is a lamp, and one object of the invention is to provide a lamp the bowl or main reservoir of which, by inclining or tilting the lamp, may be charged from a storage reservoir with a predetermined and fixed quantity of oil, the end in view being so to construct the lamp that the same will burn for a fixed interval, and then go out.

The invention aims to provide a means whereby the main reservoir may be partially filled from the storage reservoir, to provide means whereby a constant or fixed level may be maintained in the main reservoir, to provide means for admitting air into the storage reservoir while the oil is passing from the storage reservoir into the main reservoir, and to provide means whereby, at the will of an operator, the height or depth of the oil in the main reservoir may be varied, thereby to alter the period of time during which the lamp will burn.

Another object of the invention is to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing:—Figure 1 shows in sectional side elevation, a lamp constructed in accordance with the present invention, parts being broken away; Fig. 2 is a side elevation in the nature of a diagram, the lamp being shown in a tilted or inclined position; Fig. 3 is a fragmental detail in vertical section illustrating the mechanism whereby at the will of an operator, the main reservoir is drained into the storage reservoir; Fig. 4 is a top plan of the partition which separates the reservoirs, the pipes which pass through the partition being shown in section.

In carrying out the present invention there is provided a lamp comprising a pedestal 1, closed at the bottom to form a storage reservoir. The pedestal 1 supports a bowl 2 constituting the main reservoir. The bowl 2 is equipped with a nipple 3 carrying a burner 4 of any desired sort, the latter including a wick 5 which dips into the bowl or main reservoir 2. The bowl 2 is provided with a removable cap 6 which preferably fits somewhat loosely, so as to admit air. The cap 6 constitutes a means whereby oil may find its way into the storage reservoir or pedestal 1 and serves also to facilitate the mounting in place of a plug or partition 7 which serves to separate the main reservoir from the storage reservoir, as will be clearly understood from Fig. 1.

A filling tube for the main reservoir 2, which tube is indicated by the numeral 8, passes through the plug or partition 7 and upstands in the main reservoir, the upper end of the tube 8 preferably being inclined or curved laterally as shown at 9. An air tube 10 passes through the plug or partition 7 and extends terminally into the storage reservoir 1 and the main reservoir 2, the lower end of the tube 10 being laterally curved or inclined as shown at 12. Adjacent its upper end, the tube 10 is provided with an opening 11.

A boss 14 is attached to the top of the bowl or main reservoir 2 and serves as a mounting for the upper end of a drainage tube 15, the lower end of which passes through the partition 7 and communicates with the storage reservoir 1. In the side wall of the tube 15 and above the partition 7 is an inlet opening 16 which communicates with the main reservoir 2. At its lower end, the drainage tube 15 is equipped with one or more outlets 17 which communicate with the storage reservoir 1. Extended across the interior of the tube 15 below the inlet 16 is a valve seat 18 adapted to coöperate with a valve 19 secured to a rod 20 mounted to slide in the upper end of the tube 15. The valve 19 is constrained to a closed position by means of a compression spring 21 surrounding the lower end of the rod 20 and abutting against the valve 19 and the bottom of the tube 15. The rod 20 adjacent its upper end is provided with a pin or projection 22 adapted to traverse a curved slot 23 formed in the boss 14.

Presupposing that there is no oil in the main reservoir 2, as shown in Fig. 1, the operation of the structure is as follows:—The lamp is inclined or laid on its side as shown in Fig. 2, under which circumstances oil will flow through the filling tube 8 from the storage reservoir 1 into the bowl 2. During this operation the inclined curved end 12 of the pipe 10 upstands above the level of the oil in the storage reservoir 1 and thus air is admitted from the main reservoir 2 into the storage reservoir 1 by way of the tube 10, the function of the opening 11 in the tube being obvious. After an interval of time, the lamp is stood upright, as shown in Fig. 1. The oil in the main reservoir 2 will now drain back into the storage reservoir 1 through the pipe 8 until a predetermined amount of oil stands in the main reservoir 2, the level in the reservoir 2 being determined by the position of the opening 11 in the tube 10 or by the height of the upper end of the tube 8 above the partition or plug 7. The spring 21 serves to maintain the valve 19 closed under normal working conditions, and consequently the oil in the main reservoir 2 will not drain back into the storage reservoir 1 through the tube 15. It is now obvious that since a fixed quantity of oil has been deposited in the main reservoir 2, the lamp will burn until this oil is consumed, and then will go out.

Let it be supposed that the device is so constructed that it will burn for a half an hour, under the conditions above pointed out and let it be supposed that it is desired that the lamp shall burn for a shorter period, say a quarter of an hour. Then, the level of the oil in the main reservoir 2 may be lowered by depressing the rod 20 and unseating the valve 19, whereupon the oil will slowly drain from the main reservoir 2 into the storage reservoir 1 by way of the opening 16, the tube 15 and the openings 17. In this manner, the operator may at any time diminish the amount of oil in the main reservoir 2 and consequently cut down the length of the period during which the lamp will burn before the oil in the main reservoir is consumed. When the rod 20 is depressed to unseat the valve 19, the pin or projection 22 on the rod will ride in the inclined slot 23 of the boss 14 and will be held at the lower end of the slot 23, until the rod is reversely rotated to disengage the pin from the slot. Thereupon, the spring 21 will exercise its function and close the valve 19.

From the foregoing it will be obvious that it is unnecessary for the operator to hold the rod 20 during the entire time that the oil is being slowly returned from the main reservoir 2 to the storage reservoir 1 to effect a lessening of the depth of the oil in the main reservoir, or during the filling of the storage reservoir 1.

Having thus described the invention, what is claimed is:—

1. A lamp comprising a pedestal and a bowl rigidly connected with the pedestal; a partition fixed at the juncture of the pedestal and the bowl; and a tube extended through the partition and upstanding in the bowl at a fixed height, thereby to secure a constant oil level in the bowl, the tube being located adjacent the center of the bowl, whereby when the lamp is tilted in any direction, oil will flow by gravity from the pedestal into the bowl.

2. A lamp comprising a main reservoir; a storage reservoir adapted to discharge into the main reservoir when the lamp is tilted; means for establishing a level in the main reservoir; means under the control of an operator for draining the main reservoir into the storage reservoir to vary the level in the main reservoir; and a burner communicating with the main reservoir.

3. A lamp comprising a main reservoir; a storage reservoir; a pipe communicating with both reservoirs and upstanding in the main reservoir; a pipe opening into both reservoirs and having a laterally inclined end located in the storage reservoir; and a burner communicating with the main reservoir.

In testimony that I claim the foregoing as my own, I have hereto affixed my signature in the presence of two witnesses.

CHARLES N. CRAFTON.

Witnesses:
SELINA WILLSON,
I. E. SIMPSON.